US008053089B2

(12) United States Patent
Margolies et al.

(10) Patent No.: US 8,053,089 B2
(45) Date of Patent: Nov. 8, 2011

(54) SINGLE LAYER BOND COAT AND METHOD OF APPLICATION

(75) Inventors: Joshua Lee Margolies, Niskayuna, NY (US); Joseph G. Albanese, Rotterdam Junction, NY (US); Tamara Jean Muth, Ballston Lake, NY (US); Stephen D. Dillon, Duanesburg, NY (US)

(73) Assignee: General Electric Company, Schenectady, NY (US)

(*) Notice: Subject to any disclaimer, the term of this patent is extended or adjusted under 35 U.S.C. 154(b) by 14 days.

(21) Appl. No.: 12/570,011

(22) Filed: Sep. 30, 2009

(65) Prior Publication Data

US 2011/0076413 A1 Mar. 31, 2011

(51) Int. Cl.
*B32B 15/04* (2006.01)

(52) U.S. Cl. ........ 428/678; 428/679; 428/612; 428/621; 428/632; 428/687; 428/937; 416/241 R

(58) Field of Classification Search ........................ None
See application file for complete search history.

(56) References Cited

U.S. PATENT DOCUMENTS

| | | | | |
|---|---|---|---|---|
| 5,518,178 | A * | 5/1996 | Sahoo et al. | 239/13 |
| 5,817,371 | A | 10/1998 | Gupta et al. | |
| 5,817,372 | A * | 10/1998 | Zheng | 427/456 |
| 6,020,075 | A | 2/2000 | Gupta et al. | |
| 6,096,381 | A * | 8/2000 | Zheng | 427/454 |
| 6,136,453 | A * | 10/2000 | Ritter et al. | 428/612 |
| 6,254,997 | B1 * | 7/2001 | Rettig et al. | 428/553 |
| 6,361,878 | B2 * | 3/2002 | Ritter et al. | 428/548 |
| 6,368,727 | B1 | 4/2002 | Ritter et al. | |
| 6,706,319 | B2 * | 3/2004 | Seth et al. | 427/190 |
| 7,150,921 | B2 | 12/2006 | Nelson et al. | |
| 2007/0113558 | A1 | 5/2007 | Brown et al. | |
| 2009/0162670 | A1 | 6/2009 | Lau et al. | |

FOREIGN PATENT DOCUMENTS

| | | | |
|---|---|---|---|
| EP | 1939317 | A2 | 7/2008 |
| WO | 9943861 | A1 | 9/1999 |

OTHER PUBLICATIONS

Bharat K, Pant, Vivek Arya, and B.S. Mann "Development of Low-Oxide MCrAlY Coatings for Gas Turbine Applications" ; pp. 275-280. Journal of Thermal Spray Technology, vol. 16(2), Jun. 2007.
International Search Report issued in connection with corresponding EP Application No. 10179700 on Dec. 20, 2010.

* cited by examiner

*Primary Examiner* — Aaron Austin
(74) *Attorney, Agent, or Firm* — Dority & Manning, P.A.

(57) ABSTRACT

A protective coating system for metal components includes a superalloy metal substrate, such as a component of a gas turbine. A single layer bond coat is applied to the superalloy metal substrate in a thermal spray process from a homogeneous powder composition having a particle size distribution wherein about 90% of the particles by volume are within a range of about 10 μm to about 100 μm. The percentage of particles within any 10 μm band within the range does not exceed about 20% by volume, and the percentage of particles within any two adjacent 10 μm bands within the range does not deviate by more than about 8% by volume.

9 Claims, 4 Drawing Sheets

Fig. 4
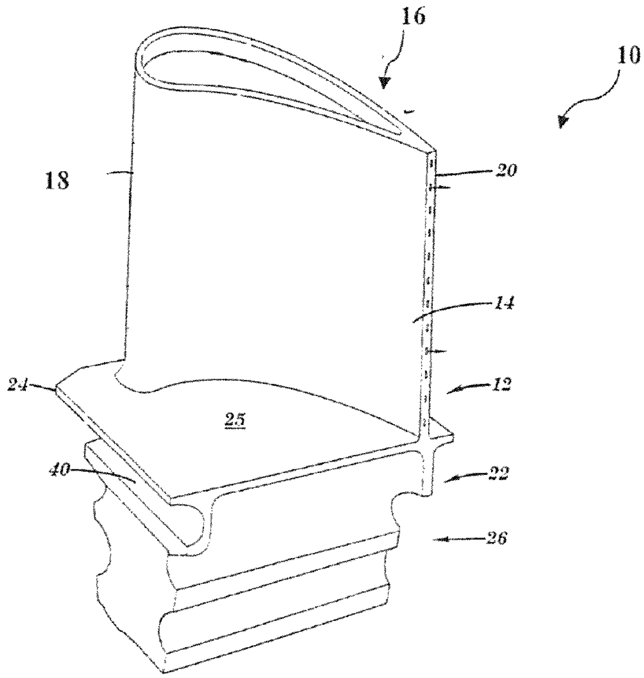
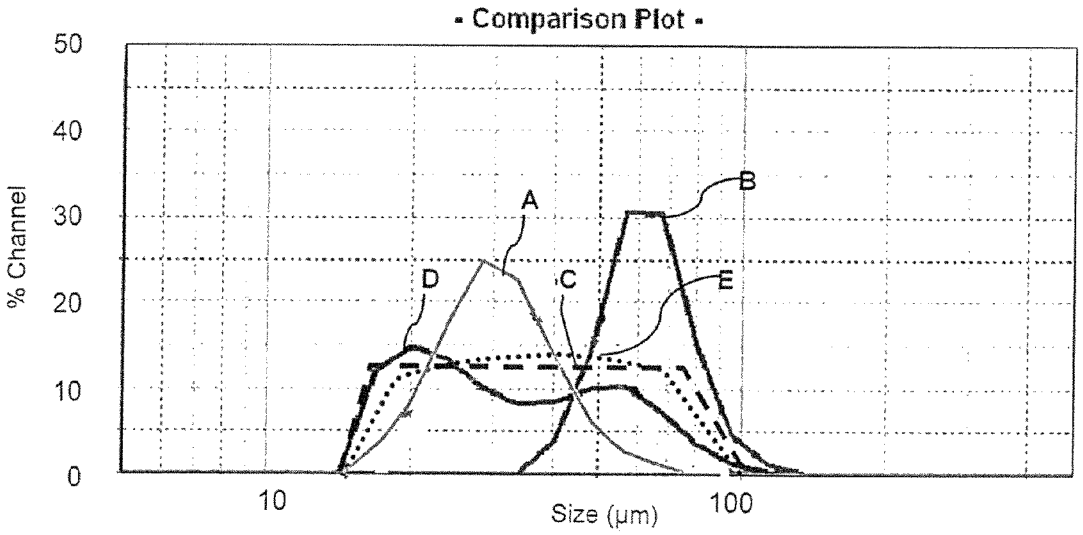
Fig. 5

Baseline Parameter

SLBC "A"

Adjusted Parameter

SLBC "A"

FCT SLBC "A"

Baseline Parameter

SLBC "B"

Adjusted Parameter

SLBC "B"

FCT SLBC "B"

SINGLE LAYER BOND COAT AND METHOD OF APPLICATION

FIELD OF THE INVENTION

The present invention relates generally to protective coatings applied to metal substrates. More specifically, the invention is directed to a single layer bond coat having the benefits of conventional bi-layer bond coats, and to the related method for application of such single layer bond coats.

BACKGROUND OF THE INVENTION

Higher operating temperatures for gas turbine engines are continuously sought in order to increase their efficiency. However, as operating temperatures increase, the temperature durability of the engine components must correspondingly increase. Significant advances in high temperature capabilities have been achieved through the formulation of nickel and cobalt-based superalloys, and through the development of oxidation-resistant overlay coatings deposited directly on the surface of the superalloy substrate to form a protective oxide scale during high temperature exposure. Nonetheless, superalloys protected by overlay coatings often do not retain adequate mechanical properties for components located in certain sections of a gas turbine engine, such as the combustor and augmentor. A common solution is to thermally insulate such components in order to minimize their service temperatures. For this purpose, thermal barrier coating (TBC) systems formed on the exposed surfaces of high temperature components have found wide use.

To be effective, TBC systems must have low thermal conductivity, strongly adhere to the article, and remain adherent throughout many heating and cooling cycles. The latter requirement is particularly demanding due to the different coefficients of thermal expansion between materials having low thermal conductivity and superalloy materials typically used to form turbine engine components. TBC systems capable of satisfying the above requirements generally require a metallic bond coat deposited on the component surface, followed by an adherent thermal barrier ceramic layer that serves to thermally insulate the component. Various ceramic materials have been employed as the thermal barrier layer, particularly zirconia ($ZrO_2$) stabilized by yttria ($Y_2O_3$), magnesia (MgO), ceria ($CeO_2$), scandia ($Sc_2O_3$), or another oxide.

The bond coat is typically formed from an oxidation-resistant aluminum-containing alloy to promote adhesion of the ceramic layer to the component and inhibit oxidation of the underlying superalloy. Examples of prior art bond coats include overlay coatings such as MCrAlY (where M is iron, cobalt and/or nickel), and diffusion coatings such as diffusion aluminide or platinum aluminide, which are oxidation-resistant aluminum-base intermetallics. The bond coat is typically disposed on the substrate by a thermal spray processes, such as vacuum plasma spray (VPS) (also know as low pressure plasma spraying (LPPS)), air plasma spray (APS), and high velocity oxy-fuel (HVOF) spray processes.

Conventional bond coats are typically applied as a bi-layer construction wherein a fine powder is first deposited on the substrate to form a dense, low oxide layer. Commercially available HVOF systems are typically used to deposit this layer. It is generally recognized that conventional HVOF processes are sensitive to particle size distributions, generally requiring finer particles ranging from −45+10 μm. The fine particle layer serves to protect the substrate from oxidation and corrosion, but the low surface roughness of the layer results in inadequate adhesion of the ceramic material layer.

A coarse powder layer is then deposited over the fine powder layer to achieve a desired degree of surface roughness for adequate adhesion of the ceramic material. APS bond coating techniques are often favored for the coarse powder layer due to lower equipment cost and ease of application and masking. Adhesion of the ceramic material layer to an APS bond coat is promoted by forming the bond coat to have a surface roughness of about 200 microinches (about 5 μm) to about 500 microinches (about 13 μm) Ra (Arithmetic Average Roughness (Ra) as determined from ANSI/ASME Standard B461-1985).

Although APS-applied bond coats provide better TBC adhesion due to their roughness, the coarse powder layer is generally unsuitable as a protective coating system. The coarse powder layer is relatively porous and prone to oxidation damage.

Thus, conventional bond coats are applied as a bi-layer in separate processes with separate equipment configurations to achieve the desired characteristics of a dense, low-oxide protective layer, and the surface roughness of a coarse powder layer. This practice, however, requires maintaining both powders in inventory, as well as the different coating systems. The process is time consuming in that it involves set up for two different processes, and can result in rework of coated pieces due to equipment or powder mix-ups.

Accordingly, the art would benefit from an improved commercially viable process for applying a single layer bond coat from a single powder composition, with the bond coat having the desired properties of conventional bi-layer bond coats.

BRIEF DESCRIPTION OF THE INVENTION

Aspects and advantages of the invention will be set forth in part in the following description, or may be obvious from the description, or may be learned through practice of the invention.

The present invention provides a protective coating system for a metal substrate, and is particularly suited for metal components of a gas turbine engine. The system includes a superalloy metal substrate having a single layer bond coat applied to the substrate. The bond coat is applied in a thermal spray process, for example a high velocity oxy-fuel (HVOF) process, from a homogeneous powder composition that results in a bond coat having properties comparable to bi-layer bond coats. The powder composition has a particle size distribution wherein about 90% of the particles by volume are within a range of about 10 μm to about 100 μm. The particles are distributed relatively uniformly within the range in that the percentage of particles within any 10 μm band within the range does not exceed about 20% by volume, and the percentage of particles within any two adjacent 10 μm bands within the range does not deviate by more than about 8% by volume. The coating system may also encompass a ceramic thermal barrier layer applied to the single layer bond coat, or the bond coat may be the only layer of the protective coating system.

The present invention also encompasses a method for forming a protective coating system on a metal substrate. The method includes applying a single layer bond coat to a superalloy metal substrate, such as a Ni or Co based superalloy, in a thermal spray process, for example an HVOF process, from a homogeneous powder composition having a particle size distribution such that the resulting bond coat has properties at least comparable to bi-layer bond coats. About 90% by volume of the particles are within a range of about 10 μm to about 100 μm. The percentage of particles within any 10 μm band within the range does not exceed about 20% by volume, and the percentage of particles within any two adjacent 10 μm bands within the range does not deviate by more than about 8% by volume. A single layer bond coat formed in accordance with the present method may have a surface roughness of at least about 300 μinch Ra, a density of at least about 90% of theoretical density; and a bond coat to substrate tensile strength of at least about 6.0 ksi. The bond coat powder composition may include MCrAlY alloy particles, where M is at least one of iron, cobalt, or nickel. In a further refinement of the method, a ceramic thermal barrier layer is applied over the single layer bond coat, with a thermal barrier layer to bond coat tensile strength that exceeds the cohesive strength of the ceramic layer, regardless of the morphology of the ceramic layer. This ceramic barrier layer may be formed from, for example, commercially available yttria stabilized ceramic coating particles.

These and other embodiments and features of the invention will be described in greater detail in the following description.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is a perspective view of a conventional gas turbine blade configuration;

FIG. 5 is a plot of the particle size distribution profile for various powder compositions;

DETAILED DESCRIPTION OF THE INVENTION

Figure 1:
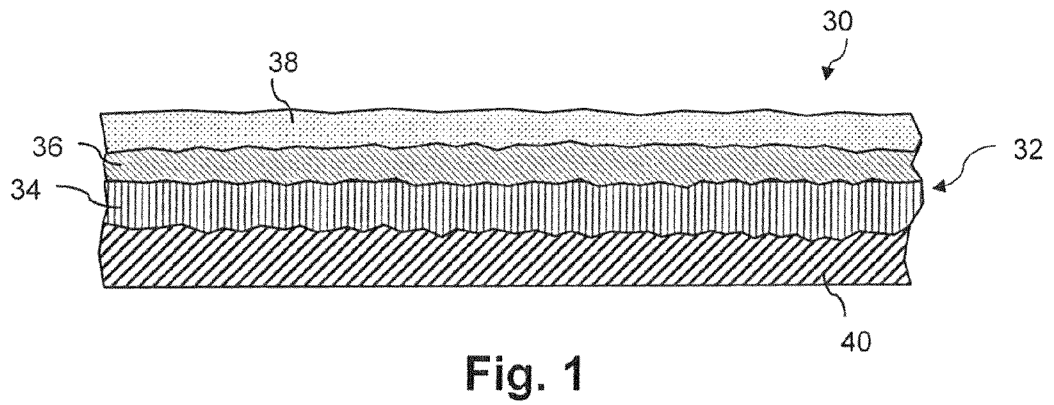
Fig. 1 (Prior Art)
FIG. 1 is a cross-sectional view of a conventional thermal barrier coat protective system having a bi-layer bond coat.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As previously discussed, thermal barrier coating (TBC) systems are often used to improve the efficiency and performance of metal parts which are exposed to high temperatures, such as nozzles, buckets, shrouds, airfoils, and other gas turbine components. The combustion gas temperatures present in conventional gas turbines are maintained as high as possible for operating efficiency, and turbine combustion components and other elements of the engine are usually made of alloys which can resist the high temperature environment, e.g., superalloys, which have an operating temperature limit of about 1000-1150 degrees Celsius. The TBC systems effectively increase the operating temperature of the turbine by maintaining or reducing the surface temperature of the alloys used to form the various engine components.

The TBC systems are also critical for protecting the surfaces of various turbine components. Referring to FIG. 1, most conventional TBC systems are dual-layer systems that include a ceramic-based top layer 38 deposited over a denser, oxidation-resistant bi-layer bond coat 32. The ceramic material is typically a material like zirconia (zirconium oxide), which is usually chemically stabilized with another material such as yttria. The bond coat 32 is applied to a metal substrate 40 as a bi-layer construction wherein a fine powder is first deposited on the substrate to form a dense, low oxide layer 34. A coarse powder layer 36 is then deposited over the fine powder layer to achieve a desired degree of surface roughness for adequate adhesion of the ceramic material 38.

Figure 2:
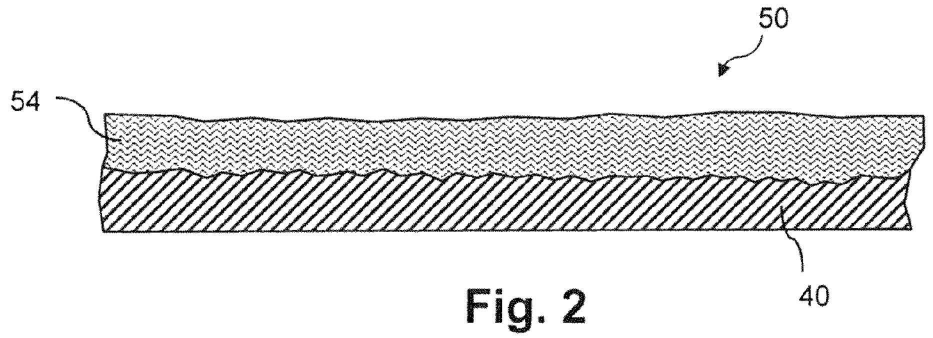
FIG. 2 is a cross-sectional view of a single layer bond coat applied to a metal substrate in accordance with aspects of the invention.
Figure 3:
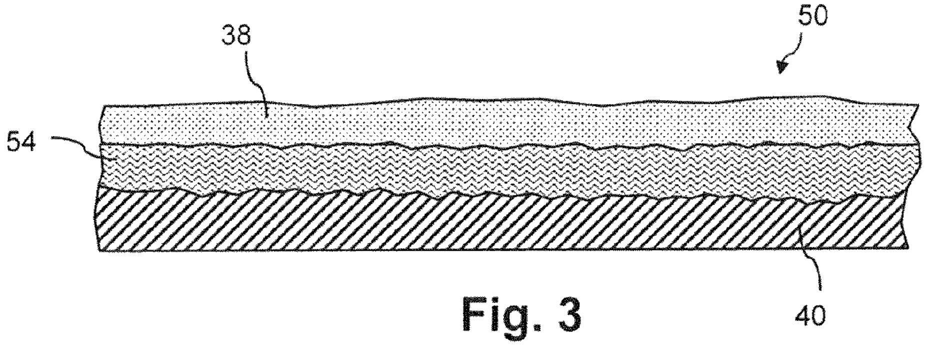
FIG. 3 is a cross-sectional view of a thermal barrier coat system having a single layer bond coat in accordance with aspects of the invention.

Referring to FIG. 2, the present invention relates to a protective coating system 50 having an improved, single layer bond coat (SLBC) 54 applied to a metal substrate 40. Although the SLBC 54 will typically form the initial layer in a TBC system, it should be appreciated that a bond coat 54 in accordance with the present invention may also be used as a stand-alone protective overlay coating on any manner of metallic substrate, i.e., without a ceramic top layer, as depicted in FIG. 2. FIG. 3 depicts a protective coating system 50 in accordance with the invention that includes a ceramic layer 38 applied over the SLBC 54.

Single layer bond coatings 54 in accordance with the invention may be applied to components of a gas turbine, as discussed above, or used in other environments, such as selected components of diesel or other types of internal combustion engines. FIG. 4 is provided for purposes of illustrating an environment in which the present invention is particularly useful, and depicts a conventional gas turbine blade configuration 10. A plurality of the blades 10 are attached to an annular rotor disk (not shown) in a gas turbine. Blade 10 includes an airfoil 12, having pressure and suction sides 14, 16, and leading and trailing edges 18 and 20. The lower part of the airfoil terminates with base 22. Base 22 includes a platform 24, in which the airfoil can be rigidly mounted in an upright position, i.e., substantially vertical to the top surface 25 of the platform. The base further includes a dovetail root 26, attached to the underside of the platform, for attaching blade 10 to the rotor. The airfoil 12 is at least one component that typically requires a thermal barrier coating.

The SLBC 54 is applied to any manner of metal substrate 40 in a thermal spray process from a homogeneous powder composition having a particle size distribution that provides the SLBC 54 with comparable characteristics of a bi-layer bond coat. In particular, the SLBC 54 has the density and low oxide content of a fine powder layer comparable to layer 34 of FIG. 1, and the surface roughness of a coarse powder layer comparable to layer 36 of FIG. 1.

Referring to the particle size distribution graph of FIG. 5, a homogeneous powder composition used in the thermal spray process to apply the SLBC 54 has the particle size characteristics of for example, graphs C, D, or E in that about 90% of the particles by volume are within a range of about 10 μm to about 100 μm. In addition, the percentage of particles within any 10 μm band within the range does not exceed about 20% by volume, and the percentage of particles within any two adjacent 10 μm bands within the range does not deviate by more than about 8% by volume. For example referring to an ideal distribution graph C, it is seen that the particles within any 10 μm (i.e., 20 to 30 μm band, or 30 to 40 μm band, or 35 to 45 μm band) do not exceed about 13% by volume of the composition, and such percentage does not deviate across the range. In other words, the percentage of particles within the band of 20 to 30 μm is the same as the percentage of particles within the band of 30 to 40 μm, and so forth.

The graph C in FIG. 5 is considered "ideal" because of its flat, truncated profile wherein the percentage of particles within the 10 μm bands is the same across the stated range (i.e., range of about 10 μm to about 100 μm). However, this profile may not be economically feasible or otherwise attainable with blends or mixtures of commercially available powders. A more realistic particle size distribution may be reflected by, for example, graph D. This profile has a "bi-modal" aspect in that distinct fine and coarse particle peaks are identifiable, yet the overall profile still satisfies the requirements set forth above.

Graph A in FIG. 5 illustrates a typical particle size distribution curve for conventional fine particles used to form an initial layer 34 (FIG. 1) in conventional TBC systems, and is provided for purposes of comparison with curves for powder compositions in accordance with the present invention Conventional fine powders have a particle size distribution range of generally about −53+22 μm (d10 percentile of approximately 22 μm; d90 percentile of approximately 53 μm). Commercial HVOF powders are typically in the range of about −45+10 μm. Graph B is a typical particle size distribution curve for coarse powders used to form the second layer 36 of conventional bond coats 32 (FIG. 1), and is also provided for comparative purposes. These coarse powders have a particle size distribution range of about −100+44 μm (d10 percentile of approximately 44 μm; d90 percentile of approximately 100 μm).

Graph E in FIG. 5 is provided as an example of another type of powder composition that falls within the scope of the present invention. This graph has a profile that reflects a generally continuously changing profile similar to a bell-curve that still satisfies the requirements set forth above. It should be appreciated that any manner of particle size distribution curve is possible that satisfies the requirements of the present invention, and that the invention is not limited to any particular curve or distribution profile that satisfies the stated requirements.

The SLBC 54 formed from a powder composition as described above has a surface roughness of at least about 300 μinch Ra (Arithmetic Average Roughness (Ra) as determined from ANSI/ASME Standard B461-1985). In particular embodiments, the surface roughness will be at least about 400 μinch Ra. The rough surface serves to ensure good adhesion between the bond coat and a subsequently applied thermal barrier material. It should be appreciated that the surface roughness value of the SLBC is not an issue when the SLBC is used as the only layer in the protective coating system, i.e., a ceramic thermal barrier material layer is not applied over the SLBC.

Single layer bond coats 54 according to the present process may be formed having any suitable thickness. Typical bond coats in a bi-layer coating system are typically within a range of about 250 μm to about 500 μm. A SLBC 54 in accordance with the present invention may not need to be as thick as these conventional bond coats, and may have a thickness less than conventional bond coats, for example, of about 125 μm, or 200 μm. It is believed that a 200 μm SLBC will produce the equivalent life of a 350 μm bi-layer bond coat.

The SLBC 54 will also have a density of at least about 90% of theoretical density, and in particular embodiments, at least about 95% of theoretical density.

The SLBC 54 also has a bond coat to substrate tensile strength of at least about 6.0 ksi, and in particular embodiments, at least about 12.0 ksi.

The SLBC 54 is applied in a thermal spray process having a particle velocity of at least about 400 m/s. Various techniques are available for measuring particle velocity downstream from the plasma gun exit, using a variety of sensor systems. As a non-limiting example, measuring systems for determining particle velocity and particle velocity distribution are described in U.S. Pat. No. 6,862,536 (Rosin). One example of an on-line particle monitoring and measurement device which is commercially available is the DPV-2000 system, available from Tecnar Automation Ltd, Montreal, Canada (http://www.tecnar.com/).

Although it is generally held that conventional high velocity oxy-fuel (HVOF) thermal spray systems are sensitive to particle size distributions (generally requiring finer particles ranging from −45+10 μm), the present inventors have found that such HVOF systems may be used for the protective coating system and methodology of the present invention. By carefully monitoring and adjusting the HVOF thermal spray parameters, a single layer bond coat is achievable from a powder composition as described herein that is dense and relatively oxide-free, yet has the surface roughness and porosity required for good adhesion of a ceramic material layer. For example, the combustion ratio in a HVOF process for purposes of the present invention should be less than about 0.29, and desirably within a range of about 0.27 to about 0.29. This combustion ratio with the powder composition discussed above yields satisfactory deposition rates.

With respect to deposition rates, the relationship of pounds of powder per mil of coating per square unit of area coated is an objective standard. A deposit efficiency is desirable that produces a satisfactory coating without excess wastage of powder. A baseline parameter may first be established, for example 0.13 lbs. per mil of coating per square foot of surface coating. The combustion ratio may then be adjusted from a low baseline value of, for example, 0.235, until the plume temperature reaches a limit indicative of excessive oxide in past experience with similar powder chemistries. With the increased combustion ratio, an increased deposit rate efficiency results of about 0.08 lbs. of powder per square foot of area coated to a thickness of about 1 mil. A further increase of the combustion ratio so that even less powder is required may lead to unacceptable levels of oxide in the coating. A deposition rate range of about 0.15 to about 0.08 lbs/mil/ft$^2$ at a combustion ratio that does not produce unacceptable oxides in the coating may be desired for purposes of the SLBC 54.

Examples of the other steps and process parameters that may be adjusted to achieve a SLBC 54 in accordance with the present invention include: cleaning of the surface prior to deposition; grit blasting to remove oxides; substrate temperature; other plasma spray parameters such as spray distance (gun-to-substrate); selection of the number of spray-passes, powder feed rate, torch power, plasma gas selection; angle-of-deposition, post-treatment of the applied coating; and the like.

Another suitable thermal spray process is a high velocity air plasma spray (HV-APS) process wherein particle velocity is maintained in the range of about 300 m/s to about 700 m/s. In some specific embodiments, the velocity is at least about 450 m/s, and may be about 600 m/s. These particle velocities are substantially greater than the typical velocities used in conventional APS systems (in the range of about 150-250 m/s). For a HV-APS system, a conventional APS system can be modified to effectively increase the plasma velocity and hence, the particle velocity. In general, modification of the APS system in this instance involves the selection of different configurations of anode nozzles which fit into the plasma spray guns, and commercial APS guns equipped with high-velocity anode nozzles can be employed to carry out the high velocity air plasma spray (HV-APS) process. Non-limiting examples include the 7 MB (or 9 MB, or 3 MB) plasma spray gun equipped with the 704 high velocity nozzle, available from Sulzer Metco, Inc. Another example is the SG100 plasma spray gun, operated in the "Mach 2" mode, available from Praxair Surface Technologies, Inc. These conventional APS gun systems may be operated in a power range of, for example, 30-50 KW.

The powder composition for the SLBC 54 may comprise MCrAlY alloy particles, where M is at least one of iron, cobalt, or nickel.

The resulting SLBC 54 has a density of at least 90% of theoretical density, and more particularly about 95% density. These densities reflect a decreased oxide content in the bond coating that greatly increases the effective TBC life and the substrate life against oxidation. Decreased oxide content in the bond coat (as reflected by an increased density) inhibits detrimental growth of thermally grown oxide (TGO) at the interface of the bond coat and ceramic coat during service of the component. It is generally accepted that TGO accelerates TBC failures, such as cracking, delamination, and spalling.

Referring to FIG. 3, the protective coating system 50 of the present invention may also encompass application of a thermal barrier material 38 applied over the bond coat 54, which may include any of various known ceramic materials, such as zirconia ($ZrO_2$) stabilized by yttria ($Y_2O_3$), magnesia (MgO), ceria ($CeO_2$), scandia ($Sc_2O_3$), or another oxide. Commercially available yttria stabilized ceramic coating particles may be used for the TBC material, for example, Sulzer Metco 240NS 8 wt % yttria stabilized zirconia powder having a particle size distribution range of about −11+125 μm (d10 percentile of approximately 11 μm; d90 percentile of approximately 125 μm), or Sulzer Metco 240NA powder having a particle size distribution range of about −97+25 μm. The ceramic barrier material 38 may be deposited by any suitable known technique, such as by physical vapor deposition (PVD) techniques, particularly electron beam physical vapor deposition (EBPVD), or conventional APS techniques. Desirably, the coating system 50 produces a thermal barrier coat 38 to bond coat 54 tensile strength that exceeds the cohesive strength of the ceramic layer, regardless of the morphology of the ceramic layer. For example, for a dense vertically cracked ceramic layer, a tensile strength of at least about 4.0 ksi., and at least about 5.0 ksi. in certain embodiments, may be desired. The thickness of the ceramic barrier coating 38 will depend on the end use of the part being coated. The thickness is usually in the range of about 100 microns to about 2500 microns. In some specific embodiments for end uses such as airfoil components, the thickness is often in the range of about 125 microns to about 750 microns.

Gas turbine component parts are exemplified as the "metal substrate" in this patent specification. It should be appreciated, however, that other types of components could serve as metal substrates for bond coats in accordance with the invention. As one example, the substrate may be the piston head of a diesel engine, or other automotive parts. It should be readily appreciated that the invention is not limited to any particular type of metal substrate or component.

EXAMPLES

The following examples are merely illustrative, and should not be construed to be any sort of limitation on the scope of the claimed invention.

Example 1

Figure 6:
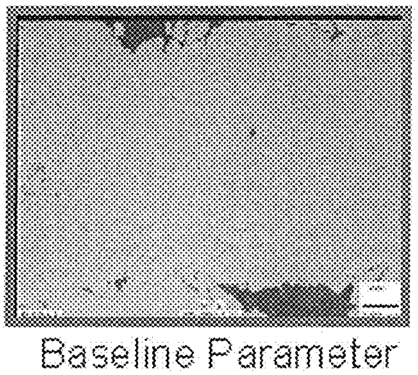
FIGS. 6 through 8 are micrograph pictures of test samples having a first embodiment of a single layer bond coat in accordance with aspects of the invention.
Figure 7:
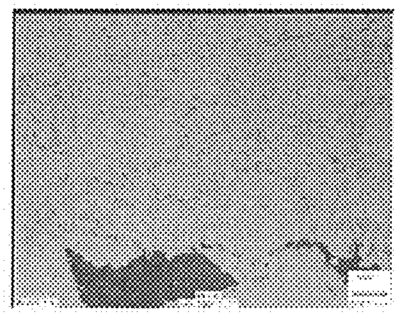

A first (Sample A) bi-modal MCrAlY powder composition having a particle size distribution generally in accordance with Graph D of FIG. 5 was evaluated for microstructure properties, surface roughness, and deposit efficiency as compared to a conventional bi-layer bond coat. An initial bond coat test button sample was thermally sprayed in a HVOF process with a Sulzer Metco DJ 2600 system. This baseline sample is illustrated in the micrograph picture of FIG. 6. The spray process parameters were adjusted to optimize deposit efficiency, as discussed above. In particular, baseline spray parameters included a combustion ratio of about 0.235 and a low deposit rate, which produced an inefficient process wherein essentially more of the powder was landing on the floor of the chamber than was adhering to the component. Using process monitoring diagnostics, the combustion ratio was increased until the plume temperature reached a limit indicative of excessive oxide in past experience with similar powder chemistries. This new parameter produced a combustion ratio with a significant improvement in efficiency of powder sticking to the component. The deposition rate was adjusted to between about 0.08 to about 0.1 lbs/mil/ft$^2$ at a combustion ratio (Oxygen/Fuel ratio) of about 0.28 (resulting in a deposition rate of about 0.68 mils/pass), to produce the adjusted test button sample shown in the micrograph picture of FIG. 7. This adjusted test sample was inspected for microstructure properties and satisfied the density requirement of at least about 90% of theoretical, and had a measured surface roughness of about 490 Ra. The sample exhibited a bond coat to substrate tensile strength exceeding 12.0 ksi. A ceramic thermal barrier coat was added to the bond coat of FIG. 7 in an APS process from a yttria stabilized ceramic powder to produce the test sample shown in the micrograph of FIG. 8. This test sample exhibited a ceramic thermal barrier coat to bond coat tensile strength of about 5.1 ksi.

Example 2

Figure 9:
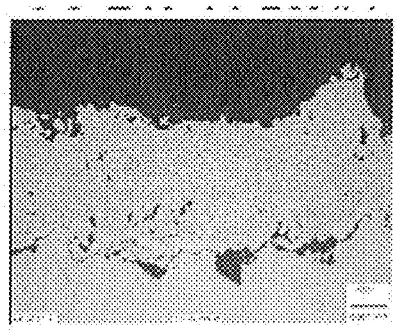
FIGS. 9 through 11 are micrograph pictures of test samples having a second embodiment of a single layer bond coat in accordance with aspects of the invention.
Figure 10:
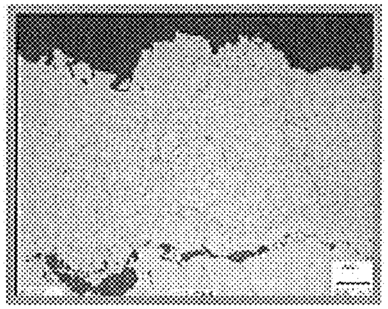

A second (Sample B) bi-modal powder composition having a particle size distribution generally in accordance with Graph D of FIG. 5 was used to produce test buttons as described above with respect to Sample A. The baseline sample is illustrated in the micrograph picture of FIG. 9. The deposition rate was adjusted to about 0.53 mils/pass at a combustion ratio (Oxygen/Fuel ratio) of about 0.28 to produce the adjusted test button sample shown in the micrograph picture of FIG. 10. This adjusted test sample was inspected for microstructure properties and satisfied the density requirement of at least about 90% of theoretical, and had a surface roughness of about 452 Ra. The sample exhibited a bond coat to substrate tensile strength exceeding 12.0 ksi. The same ceramic thermal barrier material was added to the adjusted test sample to produce the test sample shown in the micrograph of FIG. 11. This sample exhibited a ceramic thermal barrier coat to bond coat tensile strength of about 5.7 ksi.

The below table (Table 1) summarizes the results discussed above for the Sample A and Sample B SLBC systems as compared to a conventional bi-layer bond coat:

TABLE 1

| Sample | Dep Rate (mils/pass) | Ra (μinch) | BC Microstructure pass/fail | BC Tensile (ksi) | TBC Tensile (ksi) |
|---|---|---|---|---|---|
| Sample A | 0.68 | 490 | PASS | >12 | 5.1 |
| Sample B | 0.53 | 452 | PASS | >12 | 5.7 |
| Bi-layer | .6-.65 | 418 | PASS | >12 | 5.7 |

Figure 8:
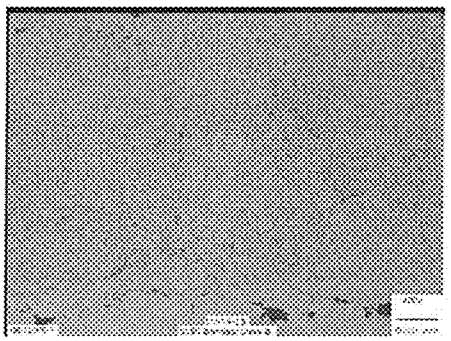
Figure 11:
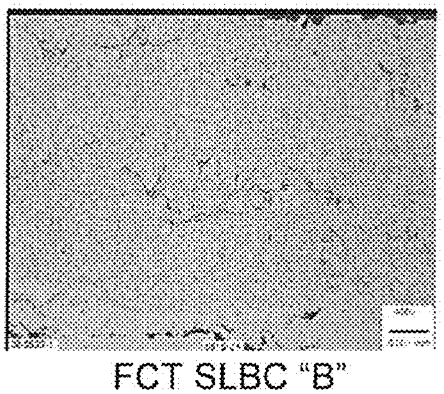

The samples of FIGS. 8 and 11 were then tested for TBC endurance in various furnace cycle tests (FCT) by raising the sample temperature to 1900° F. (first test) and 2000° F. (second test) in about 10 minutes in a bottom-loading CM furnace, followed by a hold period of 0.75 and 20 hrs, respectively, and then cooling to less than 500° F. in about 9 minutes. The cycle is repeated until more than 20% of the surface area of the ceramic coating spalls from the underlying surface. The approximate hours to failure for the Sample A, Sample B, and comparative Bi-layer sample are provided in the below table (Table 2):

TABLE 2

| FCT Approximate Hours to failure | | | | |
|---|---|---|---|---|
| | 1900° F. | | 2000° F. | |
| Sample | 0.75 hr | 20.0 hr | 0.75 hr. | 20.0 hr |
| Sample A | 1800 | 2750 | 240 | 1400 |
| Sample B | 2300 | 5700 | 400 | 1350 |
| Bi-layer | 800 | 5700 | 400 | 1300 |

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A protective coating system for metal components, comprising:

a superalloy metal substrate;

a single layer bond coat applied to the superalloy metal substrate, said bond coat applied in a thermal spray process from a single homogeneous metallic powder composition having a particle size distribution wherein:

about 90% of the particles by volume are within a range of about 10 μm to about 100 μm;

the percentage of particles within any 10 μm band within the range does not exceed about 20% by volume; and the percentage of particles within any two adjacent 10 μm bands within the range does not deviate by more than about 8% by volume.

2. The system in claim 1, wherein said bond coat comprises the following additional characteristics:

a surface roughness of at least about 300μ inch Ra;

a density of at least about 90% of theoretical density; and a bond coat to substrate tensile strength of at least about 6.0 ksi.

3. The system as in claim 1, wherein said bond coat comprises the following additional characteristics:

a surface roughness of at least about 400μ inch Ra;

a density of at least about 95% of theoretical density; and a bond coat to substrate tensile strength of at least about 12.0 ksi.

4. The system as in claim 1, wherein said single layer bond coat is applied in a thermal spray process having a particle velocity of at least about 300 m/s.

5. The system as in claim 1, wherein said single layer bond coat is applied in one of a high velocity oxy-fuel (HVOF) thermal spray process or a high velocity air plasma spray (HV-APS) thermal spray process.

6. The system as in claim 1, further comprising a ceramic thermal barrier coat (TBC) applied over said single layer bond coat, and a TBC to bond coat tensile strength that exceeds the cohesive strength of the ceramic thermal barrier coat material.

7. The system as in claim 6, wherein the TBC to bond coat tensile strength is at least about 4.0 ksi.

8. The system as in claim 1, wherein said bond coat powder composition comprises MCrAlY alloy particles, where M is at least one of iron, cobalt, or nickel.

9. The system as in claim 1, wherein said metal substrate is a component of a gas turbine.

* * * * *